United States Patent
Shavit et al.

(10) Patent No.: US 9,842,436 B2
(45) Date of Patent: Dec. 12, 2017

(54) SEAMLESS TEXTURE TRANSFER

(71) Applicant: Autodesk, Inc., San Rafael, CA (US)

(72) Inventors: Adi Shavit, Mevasseret Zion (IL); Itamar Berger, Herzliya (IL); Tomer Galon, Holon (IL)

(73) Assignee: Autodesk, Inc., San Rafael, CA (US)

( * ) Notice: Subject to any disclaimer, the term of this patent is extended or adjusted under 35 U.S.C. 154(b) by 133 days.

(21) Appl. No.: 14/704,770

(22) Filed: May 5, 2015

(65) Prior Publication Data
US 2016/0328861 A1 Nov. 10, 2016

(51) Int. Cl.
G09G 5/00 (2006.01)
G06T 19/20 (2011.01)

(52) U.S. Cl.
CPC .......... G06T 19/20 (2013.01); *G06T 2210/04* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 5,363,476 A * | 11/1994 | Kurashige | ............... | G06T 15/04 345/419 |
| 8,749,580 B1 * | 6/2014 | Lininger | ............... | G11B 27/322 345/473 |
| 2002/0063724 A1 * | 5/2002 | Powers | ............... | H04N 1/00127 345/629 |
| 2005/0081161 A1 * | 4/2005 | MacInnes | ........... | G06F 17/5004 715/765 |
| 2008/0198175 A1 * | 8/2008 | Sun | ....................... | H04N 1/3876 345/629 |
| 2010/0165414 A1 * | 7/2010 | Kautto | ................... | B42D 25/29 358/3.28 |
| 2010/0295869 A1 * | 11/2010 | Apted | ................... | G06T 1/0007 345/642 |

OTHER PUBLICATIONS

Chen et al. "A Robust Descriptor based on Weber's Law", 2008 IEEE, pp. 1-7.*
Farbman, Z., et al., "Coordinates for Instant Image Cloning", ACM Transactions on Graphics vol. 28, Issue 3, Proc. ACM SIGGRAPH 2009, Aug. 2009.
Farbman, Z., et al., "Convolution Pyramids", ACM Transactions on Graphics, vol. 30, Issue 6, Proc. ACM SIGGRAPH Asia 2011, Dec. 2011.
Perez, P., et al., "Poisson Image Editing", ACM Trans. Graph., vol. 22, Issue 3, pp. 313-318, Jul. 2003.

* cited by examiner

*Primary Examiner* — Frank Chen
(74) *Attorney, Agent, or Firm* — Gates & Cooper LLP

(57) ABSTRACT

A method, apparatus, system, and article of manufacture provide the ability to seamlessly transfer a texture. An image that has an object to be concealed is acquired. A conceal tool is activated. A source patch of a first collection of pixels within the image is defined. A target patch of a second collection of pixels within the image is defined and located over the object to be concealed. The source patch is mapped onto the target patch using a transformation (T). A contrast between the source patch and the target patch along a boundary of the source patch and the target patch is measured. A color one of the one or more pixels in the second collection is accepted/rejected based on the contrast.

14 Claims, 8 Drawing Sheets

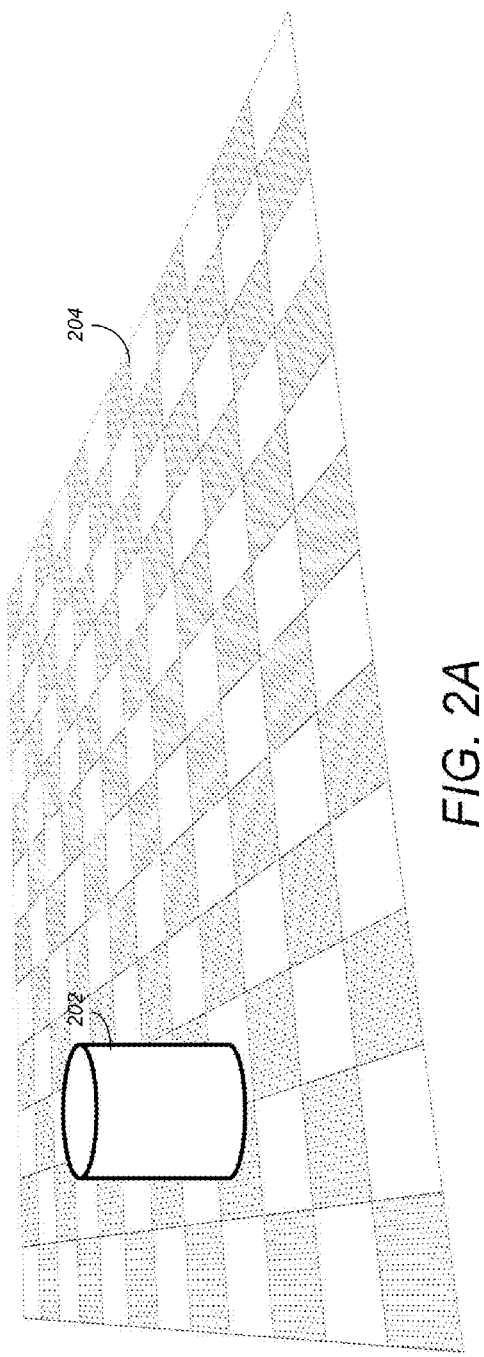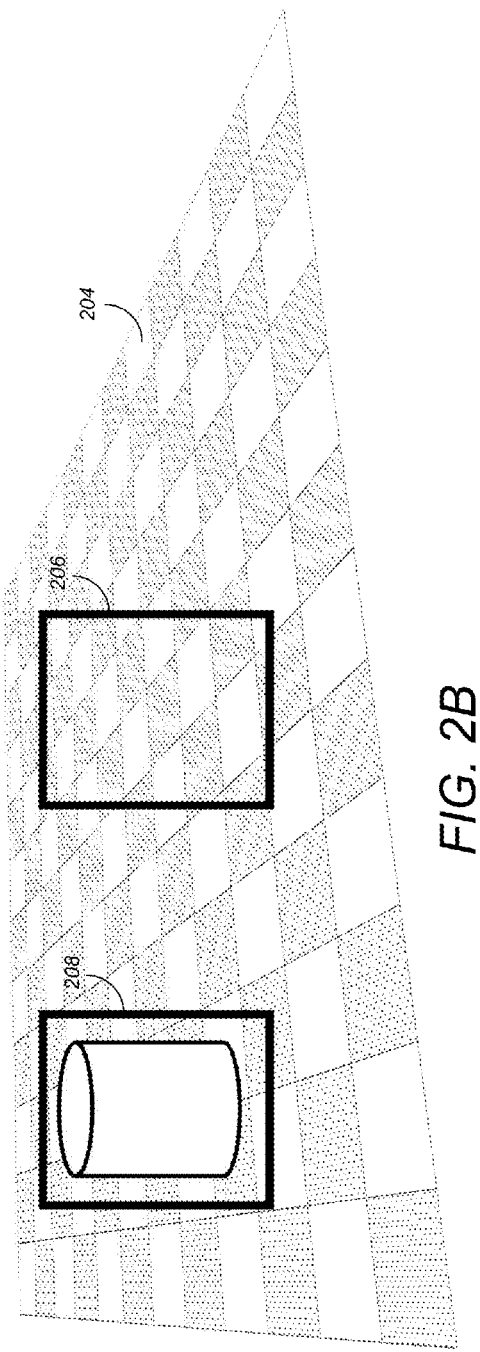

SEAMLESS TEXTURE TRANSFER

BACKGROUND OF THE INVENTION

1. Field of the Invention

The present invention relates generally to interior design, and in particular, to a method, apparatus, and article of manufacture for transferring the texture from one portion of an image to another portion of an image in a seamless manner in real-time.

2. Description of the Related Art

Given a single image or photograph of a room interior and a known three-dimensional (3D) model of the room, it is desirable to "clean" the room by concealing certain areas and regions in the photograph (e.g., using patches from other areas). For example, it may be desirable to copy a source patch of a rug to conceal a chair (the target patch), or to copy a patch of wall paper (source) to conceal a power-socket (target).

Using simple pixel copying to conceal an area/region has several problems that make such a copy technique unusable: (1) gradual lighting and illumination changes across the room cause a moved patch to appear either too dark or too light in its new position; and (2), perspective makes each patch unique and non-repeating in the image, so that even a repeating pattern in the world cannot be just moved inside the image.

With respect to the first problem relating to lighting and illumination, in prior art pixel manipulation applications (e.g., PHOTOSHOP™ MSPAINT™ etc.), a user may mark a rectangle in an image and simply copy and paste the rectangle to a new area. However, subtle lighting and illumination issues result in stark noticeable contrast in the borders of the resulting image. Further, if the outlines/borders are blurred, such blurring still fails to cure the lighting and illumination issues. In other words, the prior art systems fail to account for the internal illumination of a scene.

FIGS. 1A-1B illustrate the problems associated with illumination or surrounding brightness integration of the prior art. FIG. 1A illustrates object 102 that the user desires to remove from image 104. In other words, the user desires to clear/clean the image and remove object 102 from image 104. FIG. 1B illustrates the problems associated with prior art solutions. In particular, the user has identified a source patch 106 to be used to replace the object 102 and simply copies and pastes the source patch 106 over the object 102. As illustrated in FIG. 1B, the source patch 106 is merely copied and pasted resulting in target patch 108. The dashed line 110 illustrates the prior location of object 102. The result includes a target patch 108 that does not match the pattern/colors/illumination/brightness of the background image 104. To match the source and target, the user would have to find the exact match somewhere else in the image to copy and paste in the target. However, such an exact match may not exist, and/or is extremely difficult to find and select.

Even if prior art systems are capable of overcoming the lighting and illumination issues (e.g., using "seamless cloning" techniques), the second problem (i.e., perspective) still exists. For example, scenes are often three-dimensional and contain perspective. In a 3D picture, if a user moves a patch from one area to another, the perspective will not align properly. For example, if a room includes wallpaper with a pattern, checkered tile flooring, etc., when a patch is applied from one area to another area, the patterns/lines will not converge in the right direction. Further, a scaling issue will likely exist.

FIGS. 2A-2B illustrate the problem associated with perspective. FIG. 2A illustrates an object 202 that the user desires to remove from a 2D image 204 of a world plane. FIG. 2B illustrates the selection of a source patch 206 that will be copied and pasted over the selected target patch 208. As illustrated, the perspective of source patch 206 does not match the perspective of the target patch 208. Due to the difference in perspective, the pattern from the source patch 206 will not match the pattern in image 204 if pasted onto target patch 208. In other words, the checkered pattern boxes within target patch 208 would have a different shape and different angle from what would be expected at that location in image 204.

In view of the above, mathematically, there is no patch within one image that would be the right fit for another patch/area in an image that the user desires to conceal (except, perhaps, in some very specific degenerate cases). Further, prior art seamless cloning techniques introduce diffused colors when patches are copied across high contrast areas. Accordingly, what is needed is the capability to conceal an area of an image using a patch from within the image, in a seamless manner, in real-time, while accounting for lighting/illumination changes as well as perspective.

SUMMARY OF THE INVENTION

Embodiments of the invention overcome the problems of the prior art by warping an image such that source pixels are geometrically mapped to destination/target pixels and the texture is copied from the source pixels to the destination pixels without copying the color. Thereafter, the pixels in the border regions in the destination are blended using the color from nearby regions (to account for any visually perceptual differences). In addition, both the mapping and the blending are performed dynamically in real time as the user selects/identifies patches to be used as the source and target.

BRIEF DESCRIPTION OF THE DRAWINGS

Referring now to the drawings in which like reference numbers represent corresponding parts throughout:

FIGS. 2A-2B illustrate the problem associated with perspective;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 3:
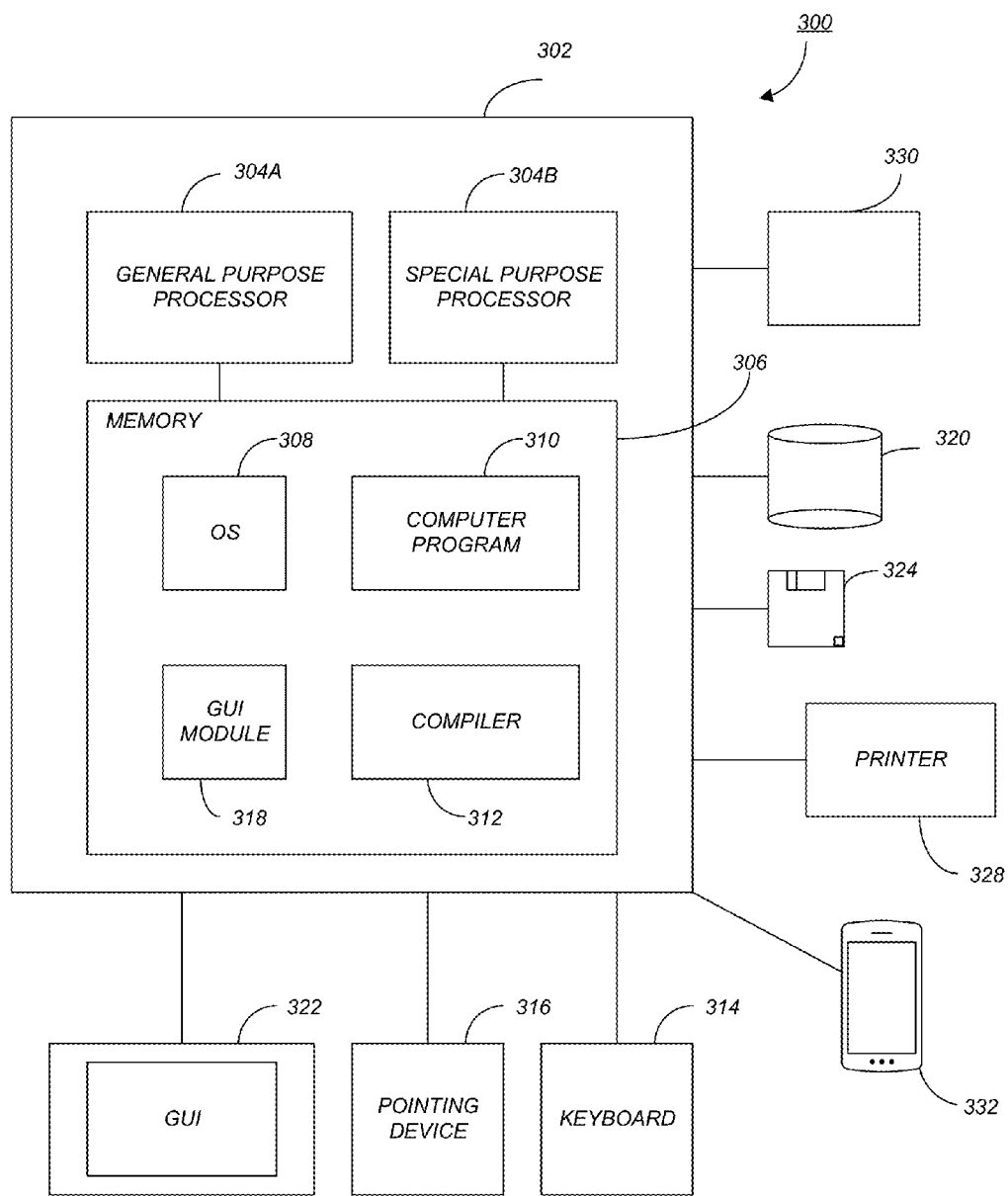
FIG. 3 is an exemplary hardware and software environment used to implement one or more embodiments of the invention.

FIG. 3 is an exemplary hardware and software environment 300 used to implement one or more embodiments of the invention. The hardware and software environment includes a computer 302 and may include peripherals. Computer 302 may be a user/client computer, server computer, or may be a database computer. The computer 302 comprises a general purpose hardware processor 304A and/or a special purpose hardware processor 304B (hereinafter alternatively collectively referred to as processor 304) and a memory 306, such as random access memory (RAM). The computer 302 may be coupled to, and/or integrated with, other devices, including input/output (I/O) devices such as a keyboard 314, a cursor control device 316 (e.g., a mouse, a pointing device, pen and tablet, touch screen, multi-touch device, etc.) and a printer 328. In one or more embodiments, computer 302 may be coupled to, or may comprise, a portable or media viewing/image acquisition/listening device 332 (e.g., digital camera, video camera, image scanner, depth sensor, an MP3 player, iPod™Nook™portable digital video player, cellular device, smart phone, personal digital assistant, etc.). In yet another embodiment, the computer 302 may comprise a multi-touch device, mobile phone, gaming system, internet enabled television, television set top box, or other internet enabled device executing on various platforms and operating systems.

In one embodiment, the computer 302 operates by the general purpose processor 304A performing instructions defined by the computer program 310 under control of an operating system 308. The computer program 310 and/or the operating system 308 may be stored in the memory 306 and may interface with the user and/or other devices to accept input and commands and, based on such input and commands and the instructions defined by the computer program 310 and operating system 308, to provide output and results.

Output/results may be presented on the display 322 or provided to another device for presentation or further processing or action. In one embodiment, the display 322 comprises a liquid crystal display (LCD) having a plurality of separately addressable liquid crystals. Alternatively, the display 322 may comprise a light emitting diode (LED) display having clusters of red, green and blue diodes driven together to form full-color pixels. Each liquid crystal or pixel of the display 322 changes to an opaque or translucent state to form a part of the image on the display in response to the data or information generated by the processor 304 from the application of the instructions of the computer program 310 and/or operating system 308 to the input and commands. The image may be provided through a graphical user interface (GUI) module 318. Although the GUI module 318 is depicted as a separate module, the instructions performing the GUI functions can be resident or distributed in the operating system 308, the computer program 310, or implemented with special purpose memory and processors.

In one or more embodiments, the display 322 is integrated with/into the computer 302 and comprises a multi-touch device having a touch sensing surface (e.g., track pod or touch screen) with the ability to recognize the presence of two or more points of contact with the surface. Examples of multi-touch devices include mobile devices (e.g., iPhone™Nexus S™Droid™ devices, smart phones, etc.), tablet computers (e.g., iPad™HP Touchpad™), portable/handheld game/music/video player/console devices (e.g., iPod Touch™MP3 players, Nintendo 3DS™PlayStation Portable™etc.), touch tables, and walls (e.g., where an image is projected through acrylic and/or glass, and the image is then backlit with LEDs).

Some or all of the operations performed by the computer 302 according to the computer program 310 instructions may be implemented in a special purpose processor 304B. In this embodiment, the some or all of the computer program 310 instructions may be implemented via firmware instructions stored in a read only memory (ROM), a programmable read only memory (PROM) or flash memory within the special purpose processor 304B or in memory 306. The special purpose processor 304B may also be hardwired through circuit design to perform some or all of the operations to implement the present invention. Further, the special purpose processor 304B may be a hybrid processor, which includes dedicated circuitry for performing a subset of functions, and other circuits for performing more general functions such as responding to computer program 310 instructions. In one embodiment, the special purpose processor 304B is an application specific integrated circuit (ASIC).

The computer 302 may also implement a compiler 312 that allows an application or computer program 310 written in a programming language such as COBOL, Pascal, C++FORTRAN, or other language to be translated into processor 304 readable code. Alternatively, the compiler 312 may be an interpreter that executes instructions/source code directly, translates source code into an intermediate representation that is executed, or that executes stored precompiled code. Such source code may be written in a variety of programming languages such as Java™Perl™Basic™etc. After completion, the application or computer program 310 accesses and manipulates data accepted from I/O devices and stored in the memory 306 of the computer 302 using the relationships and logic that were generated using the compiler 312.

The computer 302 also optionally comprises an external communication device such as a modem, satellite link, Ethernet card, or other device for accepting input from, and providing output to, other computers 302.

In one embodiment, instructions implementing the operating system 308, the computer program 310, and the compiler 312 are tangibly embodied in a non-transitory computer-readable medium, e.g., data storage device 320, which could include one or more fixed or removable data storage devices, such as a zip drive, floppy disc drive 324, hard drive, CD-ROM drive, tape drive, etc. Further, the operating system 308 and the computer program 310 are comprised of computer program 310 instructions which, when accessed, read and executed by the computer 302, cause the computer 302 to perform the steps necessary to implement and/or use the present invention or to load the program of instructions into a memory 306, thus creating a special purpose data structure causing the computer 302 to operate as a specially programmed computer executing the method steps described herein. Computer program 310 and/or operating instructions may also be tangibly embodied in memory 306 and/or data communications devices 330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 302.

Figure 4:
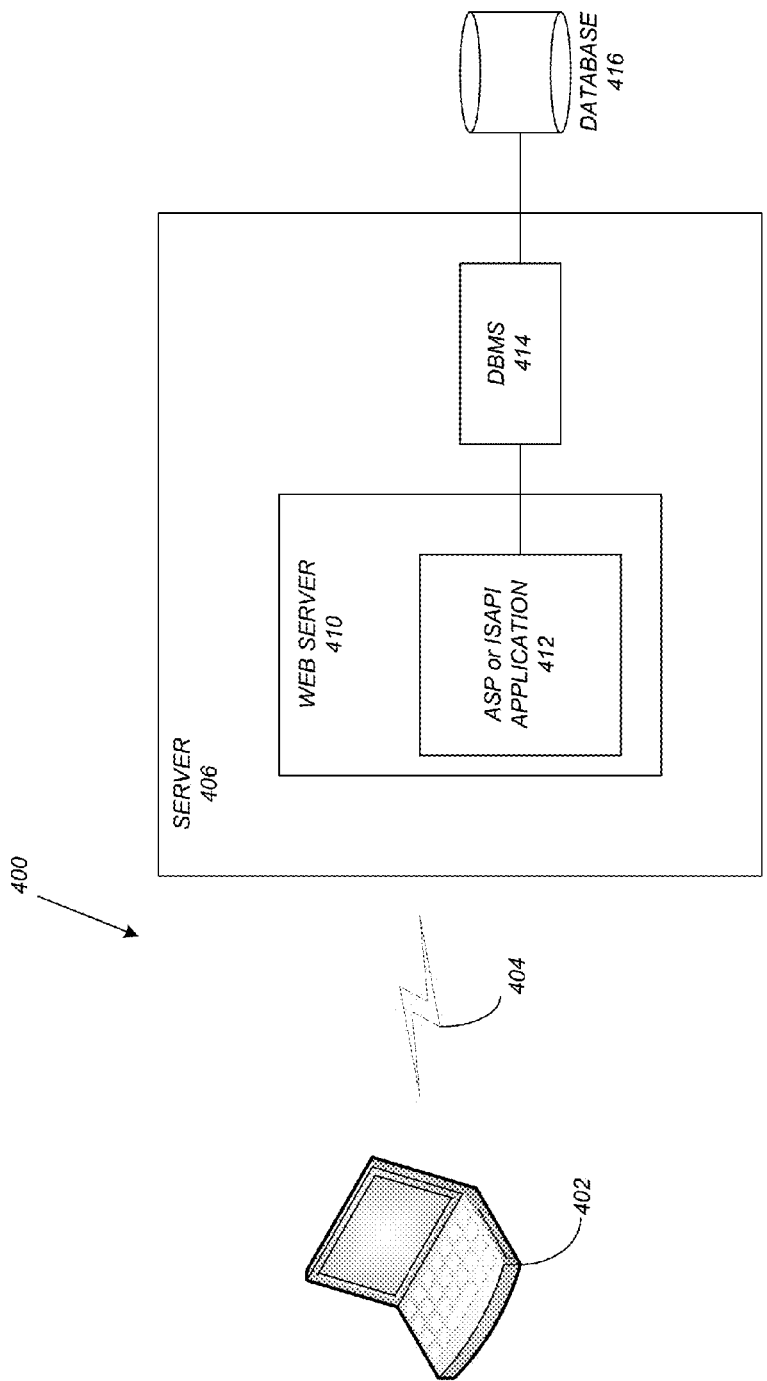
FIG. 4 schematically illustrates a typical distributed computer system using a network to connect client computers to server computers in accordance with one or more embodiments of the invention.

FIG. 4 schematically illustrates a typical distributed computer system 400 using a network 404 to connect client computers 402 to server computers 406. A typical combination of resources may include a network 404 comprising the Internet, LANs (local area networks), WANs (wide area networks), SNA (systems network architecture) networks, or the like, clients 402 that are personal computers or workstations (as set forth in FIG. 3), and servers 406 that are personal computers, workstations, minicomputers, or mainframes (as set forth in FIG. 3). However, it may be noted that different networks such as a cellular network (e.g., GSM [global system for mobile communications] or otherwise), a satellite based network, or any other type of network may be used to connect clients 402 and servers 406 in accordance with embodiments of the invention.

A network 404 such as the Internet connects clients 402 to server computers 406. Network 404 may utilize ethernet, coaxial cable, wireless communications, radio frequency (RF), etc. to connect and provide the communication between clients 402 and servers 406. Clients 402 may execute a client application or web browser and communicate with server computers 406 executing web servers 410. Such a web browser is typically a program such as MICROSOFT INTERNET EXPLORER™MOZILLA FIREFOX-™OPERA™APPLE SAFARI™GOOGLE CHROME™etc. Further, the software executing on clients 402 may be downloaded from server computer 406 to client computers 402 and installed as a plug-in or ACTIVEX™ control of a web browser. Accordingly, clients 402 may utilize ACTIVEX™ components/component object model (COM) or distributed COM (DCOM) components to provide a user interface on a display of client 402. The web server 410 is typically a program such as MICROSOFT'S INTERNET INFORMATION SERVER™

Web server 410 may host an Active Server Page (ASP) or Internet Server Application Programming Interface (ISAPI) application 412, which may be executing scripts. The scripts invoke objects that execute business logic (referred to as business objects). The business objects then manipulate data in database 416 through a database management system (DBMS) 414. Alternatively, database 416 may be part of, or connected directly to, client 402 instead of communicating/obtaining the information from database 416 across network 404. When a developer encapsulates the business functionality into objects, the system may be referred to as a component object model (COM) system. Accordingly, the scripts executing on web server 410 (and/or application 412) invoke COM objects that implement the business logic. Further, server 406 may utilize MICROSOFT'S™ Transaction Server (MTS) to access required data stored in database 416 via an interface such as ADO (Active Data Objects), OLE DB (Object Linking and Embedding DataBase), or ODBC (Open DataBase Connectivity).

Generally, these components 400-416 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer""client computer-"and/or "server computer" are referred to herein, it is understood that such computers 402 and 406 may be interchangeable and may further include thin client devices with limited or full processing capabilities, portable devices such as cell phones, smart phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 402 and 406. Accordingly, embodiments of the invention are implemented as a software application on a client 402 or server computer 406. Further, as described above, the client 402 or server computer 406 may comprise a thin client device or a portable device that has a multi-touch-based display.

Software Embodiments

Embodiments of the invention provide several modules to overcome the problems of the prior art. The modules include a perspective module and a seamless blending module.

Perspective

Given two (2) patch centers in an image, the source and the target, embodiments of the invention can use either two-dimensional (2D) patches or 3D wall patches. A source patch is defined as a collection of one or more pixels, with sub-pixel accuracy, wherein the source patch can be mapped to a target patch using some, usually bijective, transformation T. The patches are usually, but not limited to be, continuous and connected.

Examples of transformations, but are not limited to, 2D translation, 2D translation and rotation, 2D translation and scale, general affine and general projective transformations.

Given a model of a room, embodiments of the invention project each planar patch onto the 3D model's surfaces to get the 2D coordinates of the projected surface as one or more image polygons. Each such planar polygon can be warped to the target patch using a projective transformation (homography), thus preserving perspective and allowing duplicating repeating textures.

Figure 5:
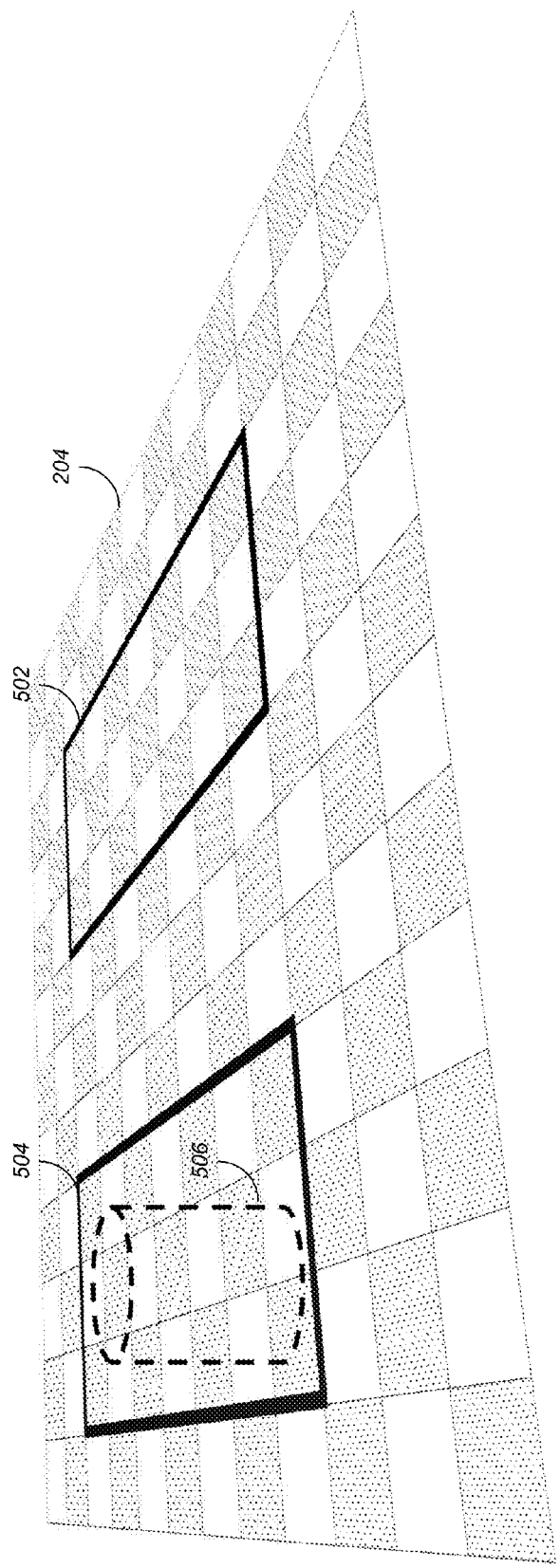
FIG. 5 illustrates the use of perspective preservation in accordance with one or more embodiments of the invention.

FIG. 5 illustrates the use of perspective preservation in accordance with one or more embodiments of the invention. Further, FIG. 5 may be compared to the illustrations in FIGS. 2A and 2B to better understand the benefits of taking perspective into account. In this regard, the perspective feature may be enabled when a user selects a 3D mode instead of a 2D mode. When in 3D mode, the shapes of both the source patch 502 and target patch 504 are altered to account for the perspective at the location where the patches 502 and 504 are located. Such perspective in FIG. 5 is distinguishable from merely using the same shape patches 206/208 that does not account for perspective as illustrated in FIG. 2B.

As illustrated in FIG. 5, the source patch 502 and the target patch 504 are both projected onto the image of the 3D model's surface 204. In this regard, as the user moves the patches 502/504 around a 3D model 204 (e.g., around the floor or up onto a wall of an interior room, etc.), the polygonal shape of the patch 502/504 changes based on the perspective at the location (within 3D model 204) where the patch 502/504 is located.

Once the source patch 502 and target patch 504 have been placed (or in real-time as each patch 502/504 is being placed), the source patch 502 is warped to the target patch 504 (e.g., using a projective transformation [homography]). Such a transformation enables or maps/warps the pixels from the source patch 502 to the target/target patch 504. Further, such a transformation serves to copy the gradients of the image (gradients are the derivatives of the pixels' differences along the x-axis and the y-axis) from the source patch 502 to the target patch 504. FIG. 5 further illustrates the outline 506 of the object that is being concealed in accordance with the invention.

Seamless Blending

Given source and target patches in the image (and/or a source patch that is in a separate image from that of the target patch), it is desirable to find a pixel transfer function that alters the source pixels' colors (position transfer is determined by the calculated transform [T]) such that the target patch will blend naturally into its destination. If separate images contain the two patches, in a 3D case, it may be assumed that there is a known transformation between the two (2) images (such a known transformation enables the transfer of pixels between the two images in a geometrically correct way). Embodiments of the invention may utilize one or more pixel transformation functions. Exemplary pixel transformation functions that may be utilized are described in one or more following prior art references, which are incorporated by reference herein:

[1] PEREZ, P., GANGNET, M., AND BLAKE, A. 2003Poisson image editing. ACM Trans. Graph. 22, 3, 313-318;

[2] Zeev Farbman, Gil Hoffer, Yaron Lipman, Daniel Cohen-Or, and Dani Lischinski, ACM Transactions on Graphics 28(3) (Proc. ACM SIGGRAPH 2009), August 2009and

[3] Zeev Farbman, Raanan Fattal, and Dani Lischinski, ACM Transactions on Graphics 30(5) (Proc. ACM SIGGRAPH Asia 2011), December 2011.

The prior art methods for seamless cloning (in references [1]-[3]) allow the external image colors and intensities at the destination locations to propagate into the cloned patch by working in the image gradient domain. Given source and target image patches, the gradients of the source patch are cloned onto the target gradients. What is actually copied is the Laplacian of the image which is the sum of the X and Y $2^{nd}$ derivatives of the image (see references for more details). This new gradient field is comprised of source gradients within the cloned patch (and destination gradients outside it). The gradients contain information about color and intensity changes, but not about the colors and intensities themselves.

The next step is to set the desired colors themselves along the patch boundaries, and perform a re-integration of the gradient field. The boundary pixels may be taken from the target image patch. Alternatively, the boundary pixels may be a mixture of target and source pixels depending on the contrast measurements. The re-integration may be performed based on a Poisson equation with Dirichlet boundary conditions. It is a large sparse equation set and can be solved, as in reference [1]using many different methods such as Successive Over Relaxation, Discrete Sine Transform and many other sparse solvers. It can also be approximated quickly, using methods as proposed in references [2]-[3]

As described above, the major problem with seamless cloning (including the methods described in references [1]-[3]) is that when some parts of the source patch differ significantly from some parts of the target patch, there is a visible "smudging" of the error from the boundary into the cloned area. Reference [2] attempts to overcome such a problem using a user-directed manual masking.

Embodiments of the invention overcome the problems of the prior art and provide an automated method to avoid smudging and allow source pixels to be transferred cleanly. In one or more embodiments of the invention, the contrast along the source and target patch boundary is measured using Weber's law. Weber's law states that the just-noticeable difference between two stimuli is proportional to the magnitude of the stimuli, or, an increment is judged relative to the previous amount. Thus, the contrast of pixels along the patch boundary is determined not by the pixel intensity difference, but by the difference divided by the original value.

One or more embodiments of the invention utilize the following function to generate contrast values between 0 and 1:

$$\text{CONTRAST} = \text{ATAN}(\text{ABSOLUTE}((T-S)/T))$$

where T is the target pixel value and S is the source pixel value. The arc-tangent function (ATAN) normalizes the result to be within the range [0,1]If CONTRAST is larger than some application specific value, the contrast it deemed too high and the target boundary pixel can be rejected to avoid smudging.

Once the contrast is computed and pixels accepted or rejected, it maybe seen that accepted pixels along the boundary are those pixels whose contrast is sufficiently small. Rejected pixels are those pixels whose source vs target pixel contrast is too large. Accepted pixels along the border are taken from the target location and rejected pixel boundary values are taken from the source patch. Such a scheme prevents smudging since high contrast colors from outside the patch will not diffuse into the patch when the gradient field is integrated since along these boundary regions, the source color is retained instead of the destination color.

Figure 1A:
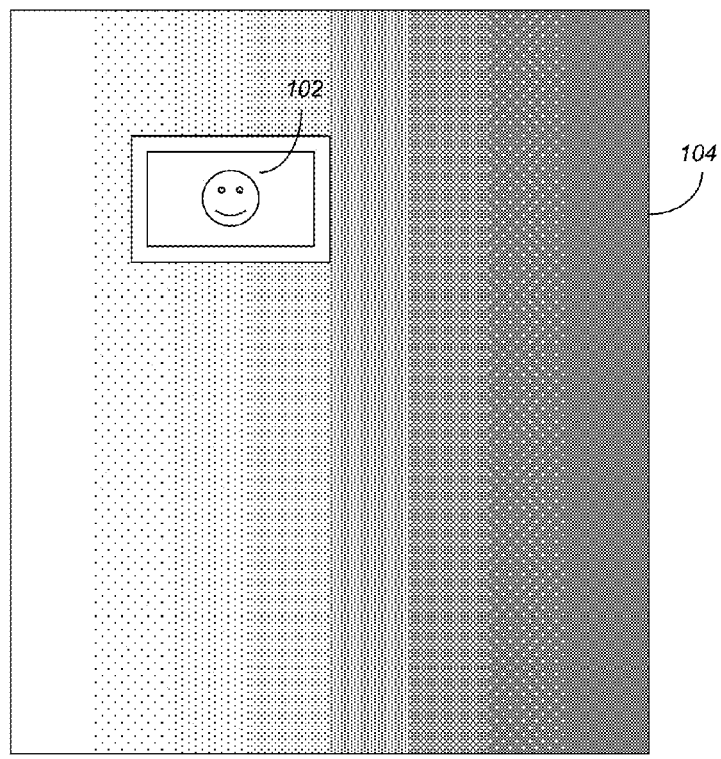
FIGS. 1A-1B illustrate the problems associated with illumination or surrounding brightness integration of the prior art.
Figure 1B:
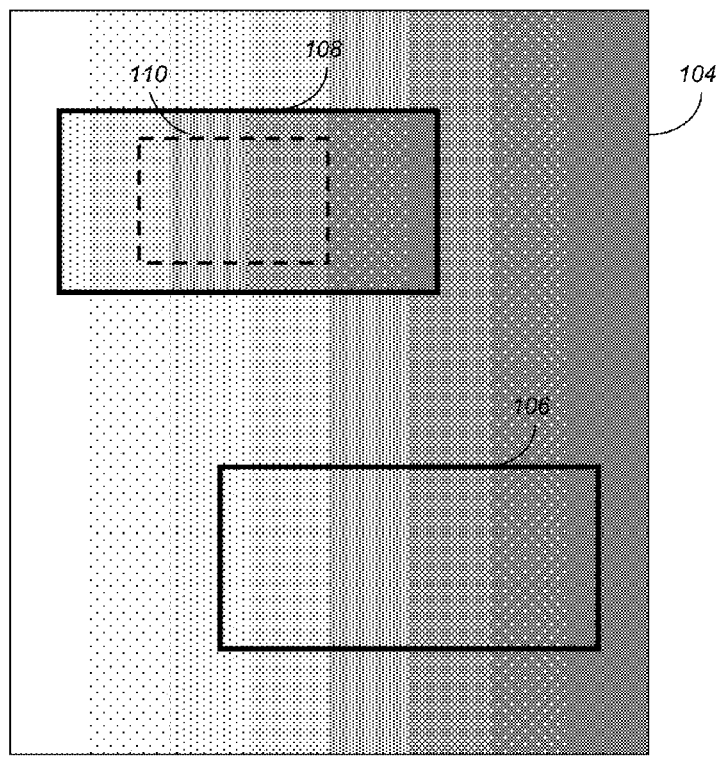
Figure 6:
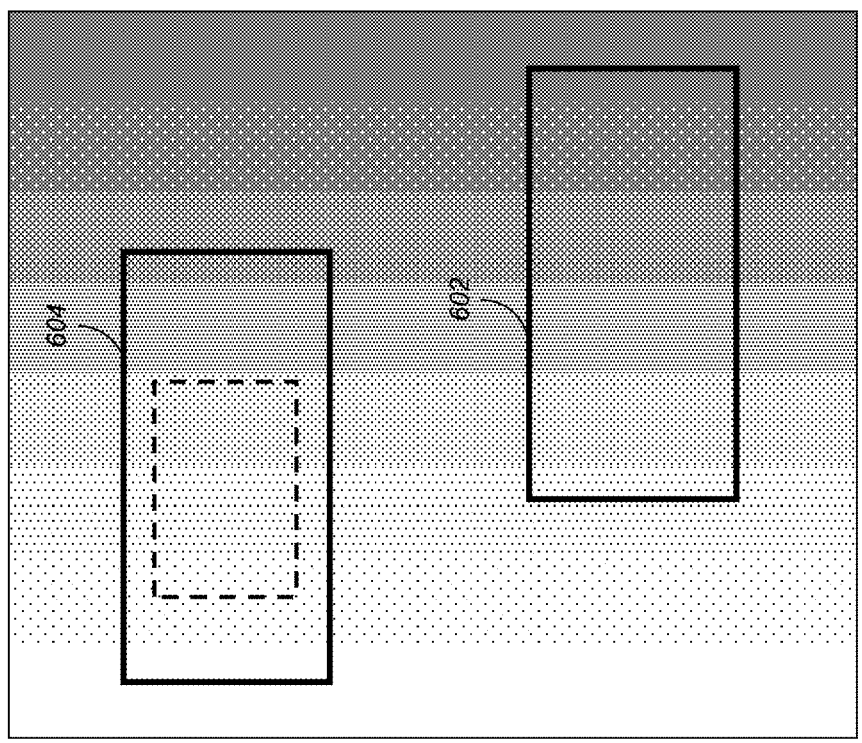
FIG. 6 illustrates the use of a seamless blending function to integrate illumination and surrounding brightness in accordance with one or more embodiments of the invention.

FIG. 6 illustrates the use of a seamless blending function to integrate illumination and surrounding brightness in accordance with one or more embodiments of the invention. FIG. 6 may be compared to the prior art seamless integration of FIG. 1B. In particular, in FIG. 6, the user has identified source patch 602 to be used to replace the content in target patch 604. Even though the colors within patch 602 do not match the colors in target patch 604, embodiments of the invention utilize a seamless cloning method based on surrounding/nearby pixels. As a result, the external colors from the boundary area of patch 604 are allowed to "bleed" into the transferred patch 604.

In view of the above, in the perspective module, the pixels are mapped from the source patch to the target patch (i.e., the source patch is warped into the target patch). Thereafter, the gradients are calculated from the source patch and combined with (and/or replace) the gradients on the target patch to provide a smooth transition of colors while preserving the original texture.

Graphical User Interface

In a user interface of the application, additional aspects may include any of the following:

1. Snapping to wall/3D model boundaries;
2. Automatically "snap" aligning patches in both 2D and 3D;
3. "Snap" aligning to previous patch positions;
4. Nudging a patch along 2D or 3D axes in small increments;
5. Confining the patches to remain within a whole surface; and/or
6. Resizing, rotating, moving patches.

Figure 7:
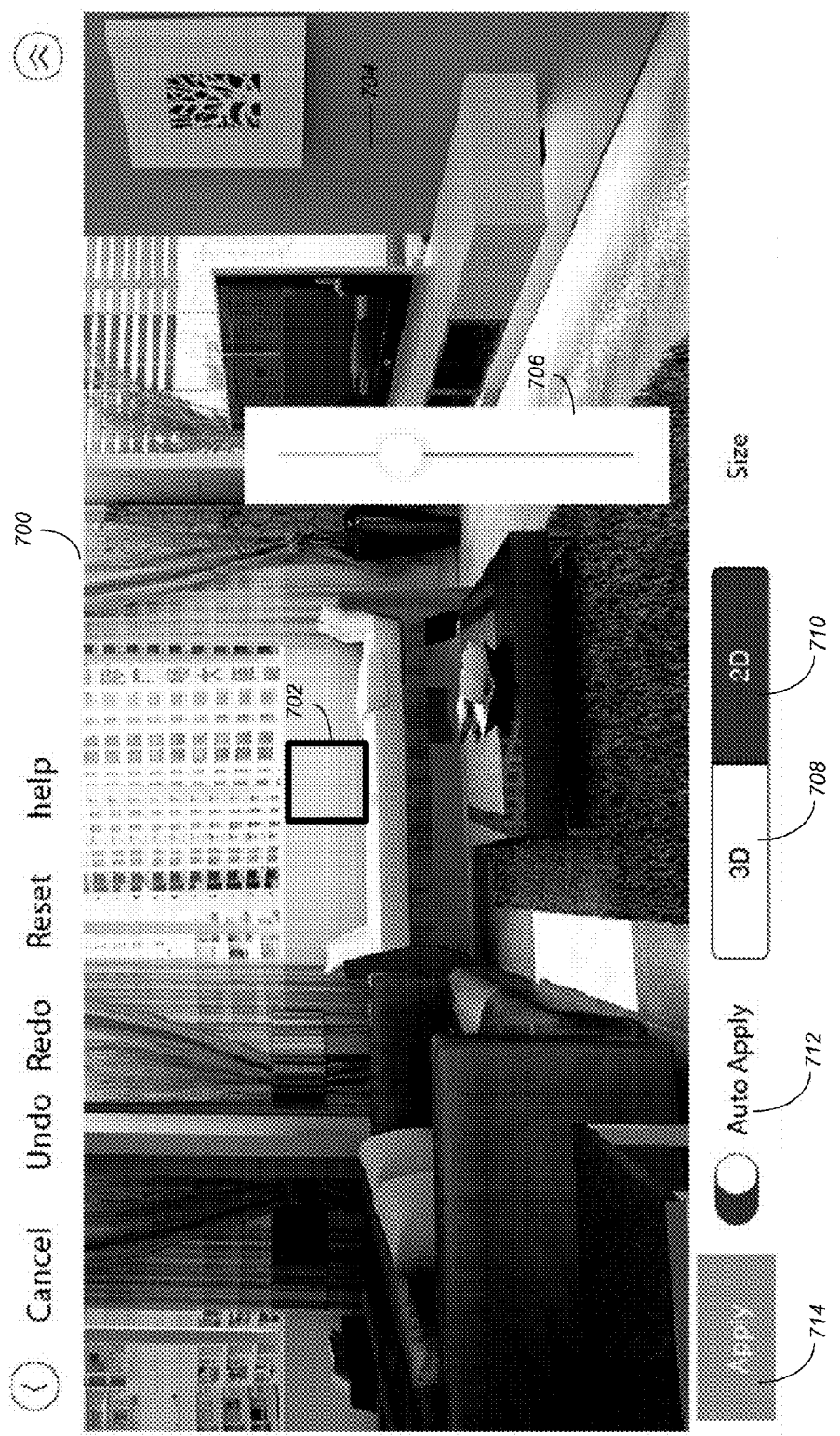
FIG. 7 illustrates an exemplary graphical user interface that may be used to configure and perform a conceal operation in accordance with one or more embodiments of the invention.

FIG. 7 illustrates an exemplary graphical user interface that may be used to configure and perform a conceal operation in accordance with one or more embodiments of the invention. A conceal tool of embodiments of the invention has been activated while viewing an image of a room interior 700. The user may select and move both the source patch 702 as the target patch 704. The user has the option to adjust the size of the patches 702/704 using a finger gesture or interacting with the size slider bar 706. Such a finger gesture may include conducting a pinch/expand gesture operation directly over one of the patches 702/704 on a touch screen device. Interacting with the slider bar 706 may include moving the indicator within the bar 706.

The user may also have the option of switching the conceal tool from a 2D operation to a 3D operation and/or vice versa (e.g., by selecting 3D button 708 or 2D button 710). Further, the AutoApply feature 712 provides the ability for the user to actively move either the source patch 702 and/or target patch 704 and after pausing at any location for a defined period of time (e.g., 1 second or 2 seconds) or upon "releasing" the moved patch, the selected seamless blending operation is automatically applied from the source patch 702 to the target patch 704. When not active, to apply the seamless blending, the user would have to manually select the apply button 714 each time. Additional user options may include the ability to select the type of blend mode that is utilized (e.g., a copy, texture, or blend of the copy and texture). For example, the copy-paste mode is similar to that of the prior art of FIG. 1 described above. The Transfer mode refers to the prior art seamless cloning, where high contrast smudging is not an issue (by allowing "texture transfer" without the underlying colors of the source patch). The blend mode refers to embodiments of the invention with an extra patch boundary contrast adjustment that prevents smudging into the patch. Further features may include the ability to lock the source and target patches 702/704 together such that when moving one of the patches 702/704, while locked together, both of them move at once.

Logical Flow

Figure 8:
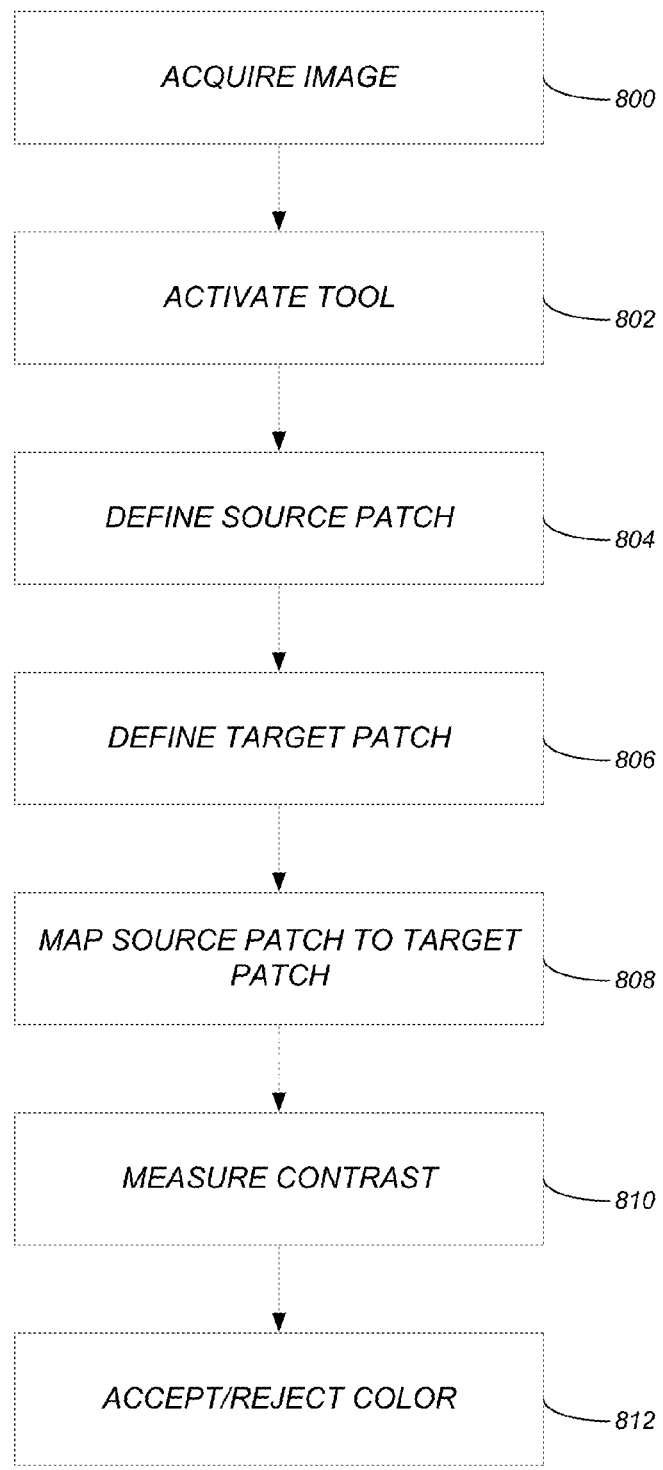
FIG. 8 illustrates the logical flow for seamless transferring a texture within an image in accordance with one or more embodiments of the invention.

FIG. 8 illustrates the logical flow for seamless transferring a texture within an image in accordance with one or more embodiments of the invention. At step 800, an image (consisting of an object to be concealed) is acquired. Such an image may be captured on a camera or smart phone, may be retrieved from a library of images, etc. Further, such an image may be a photograph of an interior room.

At step 802, a conceal tool is activated. For example, a user may select/initialize an application or "app" on a smart phone or tablet device, may navigate to a website that contains or interacts with the navigation device to initialize the tool, may insert a storage device (e.g., a USB drive, CD, DVD, disk, etc.), or may select such an application using a remote control that communicates with a set top box, gaming console, or other device.

At step 804, a source patch consisting of a first collection of one or more pixels within the image is defined.

At step 806, a target patch consisting of a second collection of one or more pixels within the image is defined. The target patch is located over the object to be concealed. Steps 804 and 806 may be defined simultaneously, serially, or a combination. In this regard, once the conceal tool is activated, two polygons (e.g., squares, rectangles, etc.) may be displayed (one for each patch). The user may then manipulate/edit the patches. In one user mode, the user can manipulate edit one patch, and any changes will be automatically and dynamically reflected in the other patch (e.g., size and location [if locked]). Alternatively, changes to one patch may not be reflected in the other patch (e.g., location).

In one or more embodiments, only a source patch is initially defined and "stored." When this source patch is moved, the new position of the dragged patch (or when the dragged patch is released [e.g., by lifting the finger in a gesture on a touch-screen device, or releasing a mouse button after moving the source patch]) is selected as a target patch position and the transfer may be automatically previewed and/or applied.

For example, the size of the patches may be defined simultaneously (at the same time) based on a user's edits to one of the patches using a slider bar, by inputting a measurement, using a gesture on a touch-screen device, etc. In addition, the locations of the two patches may be defined simultaneously (e.g., if the two patches are locked to each other) or may be placed/moved separately from each other.

The patches may be represented/displayed to the user as a polygonal shaped object. Properties of the polygonal shaped object may include an outline/line that is displayed in a particular color/pattern and a fill that is inactive (i.e., no fill) and/or transparent/semi-transparent. The two patches may also be visually distinguishable based on color (e.g., a source patch may have a black outline and a target patch may have a blue outline), pattern (e.g., dashed vs. solid outline), flashing (e.g., source patch may alternately display in a flashing mode compared to a different flashing pattern or no flashing for the target patch, and/or vice versa), etc.

At step 808 the source patch is mapped/interpolated onto the target patch using a transformation (T). Such a transformation may be a 2D translation, a 2D translation and rotation, a 2D translation and scale, etc. In one or more embodiments, the image is a scene image (i.e., an image of a scene) based on a 3D model and the source patch is a planar patch. In such an embodiment, the source patch may be projected onto the surface of the 3D model to obtain 2D coordinates of the surface as image polygons, and the transformation (T) is a projective transformation.

The process may be complete subsequent to step 808. Alternatively, to avoid smudging, steps 810-812 may be performed. At step 810, the contrast between the source and target patches are measured along a boundary of the source patch and the target patch. In other words, when the source patch is mapped to the target patch, such a step may include copying/cloning properties of the source patch onto/into the target patch. However, as described above, some parts of the source patch may differ significantly from the target patch/target patch area. Accordingly, step 810 include the measuring of the contrast along the boundary from the target patch to the cloned area of the target patch. For example, step 810 may include measuring the properties (e.g., colors, intensity, etc.) along the outside of the outline/boundary of the target patch and comparing such properties to the properties of the area inside of the target patch (that are now consumed by the cloned version of the source patch).

Alternatively, in another example, step 810 may include comparing the same pixel locations along the boundary of the target patch and the transformed source patch.

As described above, the contrast may be measured using Weber's law based on a difference divided by an original value. More specifically, the contrast may be computed as:

CONTRAST=ATAN(ABSOLUTE(($t-s$)/$t$))

wherein ATAN is an arctangent function, t is a target pixel value, and s is a source pixel value.

At step 812, the color of one or more pixels in the second collection is accepted/rejected based on the contrast. In this regard, the color of one or more pixels in the second collection may be rejected when the computed contrast is larger than a specified threshold value. In other words, if the contrast exceeds a predefined threshold, the color the pixel within the target patch (that is copied from the source patch or that is originally within the target patch) may be accepted and/or rejected and substituted with a different color (e.g., a new merged color value from the source and/or target patch and/or the value of the source patch).

In view of the above, embodiments of the invention may comprise the transfer with the 3D projective mapping (i.e., steps 802-808), a transfer with automatic smudge prevention using the contrast measurement method (i.e., steps 810-812), or a combination of the 3D projective mapping and the automatic smudge prevention.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method, apparatus, system, and article of manufacture for seamlessly transferring a texture within an image. Novel features of embodiments of the invention include (1) an automated contrast detection that allows generating pleasing texture transfers that preserve illumination while avoiding smudging; and (2) allowing perspective preserving texture transfer within a single image, or between multiple images. In this regard, embodiments of the invention allow designers to take a photo of a fully furnished room, and clean it of undesired item(s), while still retaining the photo-realistic look and feel.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for seamlessly transferring a texture, comprising:
    acquiring an image, wherein the image comprises an object to be concealed;
    activating a conceal tool;
    defining a source patch comprising a first collection of one or more pixels within the image;
    defining a target patch comprising a second collection of one or more pixels within the image, wherein the target patch is located over the object; and
    concealing the object by mapping the source patch onto the target patch using a transformation (T)
    measuring a contrast along a boundary between the source patch and the target patch;
    the contrast is measured using Weber's law based on a difference divided by an original value, wherein the contrast is computed as:

CONTRAST=ATAN(ABSOLUTE(($t-s$)/$t$))

wherein ATAN is an arctangent function, t is a target pixel value, and s is a source pixel value; and
        defining colors for pixels in the target patch based on the contrast, wherein the color of the one of the one or more pixels in the second collection is rejected when the computed contrast is larger than a specified threshold value.

2. The computer-implemented method of claim 1 wherein the image comprises a photograph of an interior room.

3. The computer-implemented method of claim 1 wherein the transformation (T) comprises a two-dimensional (2D) translation.

4. The computer-implemented method of claim 1 wherein the transformation (T) comprises a two-dimensional (2D) translation and rotation.

5. The computer-implemented method of claim 1 wherein the transformation (T) comprises a two-dimensional (2D) translation and scale.

6. The computer-implemented method of claim 1, wherein:
    the image comprises a scene image of a scene based on a three-dimensional (3D) model;
    the source patch comprises a planar patch; and
    the method further comrpises:
        projecting the source patch onto a surface of the 3D model to obtain two-dimensional (2D) coordinates of the surface as one or more image polygons, wherein the transformation (T) uses a projective transformation.

7. The computer-implemented method of claim 1, further comprising:
    measuring a contrast between the source patch and the target patch along a boundary of the source patch and the target patch; and
    accepting or rejecting a color one of the one or more pixels in the second collection based on the contrast.

8. A non-transitory computer readable storage medium encoded with computer program instructions which when accessed by a computer cause the computer to load the program instructions to a memory therein creating a special purpose data structure causing the computer to operate as a specially programmed computer, executing a method of seamlessly transferring a texture, comprising:
    acquiring, in the specially programmed computer, an image, wherein the image comprises an object to be concealed;
    activating, in the specially programmed computer, a conceal tool;
    defining, in the specially programmed computer, a source patch comprising a first collection of one or more pixels within the image;
    defining, in the specially programmed computer, a target patch comprising a second collection of one or more pixels within the image, wherein the target patch is located over the object; and
    concealing the object by mapping, in the specially programmed computer, the source patch onto the target patch using a transformation (T)

measuring a contrast along a boundary between the source patch and the target patch;

the contrast is measured using Weber's law based on a difference divided by an original value, wherein the contrast is computed as:

$$CONTRAST = ATAN(ABSOLUTE((t-s)/t))$$

wherein ATAN is an arctangent function, t is a target pixel value, and s is a source pixel value; and defining colors for pixels in the target patch based on the contrast, wherein the color of the one of the one or more pixels in the second collection is rejected when the computed contrast is larger than a specified threshold value.

9. The non-transitory computer-readable storage medium of claim 8 wherein the image comprises a photograph of an interior room.

10. The non-transitory computer-readable storage medium of claim 8 wherein the transformation (T) comprises a two-dimensional (2D) translation.

11. The non-transitory computer-readable storage medium of claim 8 wherein the transformation (T) comprises a two-dimensional (2D) translation and rotation.

12. The non-transitory computer-readable storage medium of claim 8 wherein the transformation (T) comprises a two-dimensional (2D) translation and scale.

13. The non-transitory computer-readable storage medium of claim 8, wherein:

the image comprises a scene image of a scene based on a three-dimensional (3D) model;

the source patch comprises a planar patch; and the method further comrpises:

projecting the source patch onto a surface of the 3D model to obtain two-dimensional (2D) coordinates of the surface as one or more image polygons, wherein the transformation (T) uses a projective transformation.

14. The non-transitory computer-readable storage medium of claim 8, the method further comprising:

measuring, in the specially programmed computer, a contrast between the source patch and the target patch along a boundary of the source patch and the target patch; and accepting or rejecting, in the specially programmed computer, a color one of the one or more pixels in the second collection based on the contrast.

* * * * *